United States Patent
Mount et al.

(10) Patent No.: US 8,363,265 B2
(45) Date of Patent: Jan. 29, 2013

(54) COLOR PRINTER TECHNOLOGY

(75) Inventors: Jeffrey Mount, Palm Harbor, FL (US); Steve Greenfield, Palm Harbor, FL (US); Mike Kavis, Parrish, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 1407 days.

(21) Appl. No.: 11/481,789

(22) Filed: Jul. 7, 2006

(65) Prior Publication Data

US 2007/0127062 A1    Jun. 7, 2007

Related U.S. Application Data

(60) Provisional application No. 60/742,909, filed on Dec. 7, 2005, provisional application No. 60/778,410, filed on Mar. 3, 2006.

(51) Int. Cl.
G06F 15/00 (2006.01)

(52) U.S. Cl. .......... 358/1.9; 358/2.1; 358/534; 347/115; 385/274

(58) Field of Classification Search .................... 358/1.9, 358/2.1, 534; 347/115; 382/274; 355/245
See application file for complete search history.

(56) References Cited

U.S. PATENT DOCUMENTS

| | | | |
|---|---|---|---|
| 4,980,725 A * | 12/1990 | Sumida ...................... 399/184 |
| 5,456,539 A | 10/1995 | Wright et al. |
| 5,570,451 A | 10/1996 | Sakaizawa et al. |
| 5,633,662 A | 5/1997 | Allen et al. |
| 5,666,215 A | 9/1997 | Fredlund et al. |
| 5,688,154 A | 11/1997 | Goda et al. |
| 5,737,729 A | 4/1998 | Denman |
| 5,767,886 A * | 6/1998 | Kawakami et al. ........... 347/115 |
| 5,857,175 A | 1/1999 | Day et al. |
| 5,917,513 A | 6/1999 | Miyauchi et al. |
| 6,076,068 A | 6/2000 | De Lapa et al. |
| 6,151,038 A | 11/2000 | Suzuki |
| 6,203,131 B1 | 3/2001 | Wiklof |
| 6,231,249 B1 | 5/2001 | Harris |
| 6,313,925 B1 * | 11/2001 | Decker et al. .................. 358/1.9 |
| 6,344,899 B1 | 2/2002 | Tabata et al. |
| 6,351,735 B1 | 2/2002 | Deaton et al. |
| 6,767,073 B2 | 7/2004 | Tschida |
| 2001/0021331 A1 | 9/2001 | Brewington et al. |
| 2002/0109729 A1 | 8/2002 | Dutta |
| 2002/0129002 A1 | 9/2002 | Alberts et al. |
| 2002/0143655 A1 | 10/2002 | Elston et al. |

(Continued)

FOREIGN PATENT DOCUMENTS

| | | |
|---|---|---|
| CN | 1702695 | 11/2005 |
| EP | 0928698 | 7/1998 |

(Continued)

OTHER PUBLICATIONS

Dec. 26, 2007, PCT International Search Report PCT/US06/30716.

(Continued)

*Primary Examiner* — Twyler Haskins
*Assistant Examiner* — Michael Burleson
(74) *Attorney, Agent, or Firm* — Pillsbury Winthrop Shaw Pittman LLP

(57) ABSTRACT

The invention provides a method of printing at a POS of register receipts and marketing information in which the required network bandwidth and quantity of ink are both reduced. SVG files are used to specify communications, associated modified image objects are stored locally to the POS, and associated modified image objects are modified version of original objects in which color values are replaced with other color values that result in the same print image, but with printing of less ink.

40 Claims, 6 Drawing Sheets

U.S. PATENT DOCUMENTS

| | | | |
|---|---|---|---|
| 2003/0050842 A1 | 3/2003 | Wada et al. | |
| 2003/0101095 A1 | 5/2003 | Suzuki | |
| 2003/0121929 A1 | 7/2003 | Liff et al. | |
| 2003/0197782 A1 | 10/2003 | Ashe et al. | |
| 2003/0227510 A1 | 12/2003 | Payne | |
| 2004/0004644 A1 | 1/2004 | Komatsu et al. | |
| 2004/0034570 A1 | 2/2004 | Davis | |
| 2004/0148223 A1 | 7/2004 | Ghaffar et al. | |
| 2004/0246287 A1 | 12/2004 | Usuda | |
| 2005/0040230 A1 | 2/2005 | Swartz et al. | |
| 2005/0080651 A1 | 4/2005 | Morrison et al. | |
| 2005/0264850 A1* | 12/2005 | Kim et al. | 358/2.1 |
| 2005/0271446 A1 | 12/2005 | Minowa | |
| 2006/0143075 A1 | 6/2006 | Carr et al. | |
| 2007/0045405 A1 | 3/2007 | Rothschild | |
| 2007/0206209 A1 | 9/2007 | Mount | |

FOREIGN PATENT DOCUMENTS

| | | |
|---|---|---|
| EP | 1139316 | 10/2001 |
| EP | 1292096 | 3/2003 |
| EP | 1321307 | 6/2003 |
| EP | 1267565 | 12/2003 |
| JP | 2004098503 | 4/2004 |
| WO | WO 98/21713 | 5/1998 |

OTHER PUBLICATIONS

Dec. 26, 2007, PCT Written Opinion PCT/US06/30716.

Nov. 9, 2007, PCT Internatiolnal Search Report PCT/US07/63051.

Jun. 7, 2006, Claims filed by preliminary amendment filed Jun. 13, 2008 in U.S. Appl. No. 11/481,789.

Nov. 9, 2007, PCT International Search Report PCT/US07/63051.

Nov. 9, 2007, PCT Written Opinion PCT/US07/63051.

Dec. 26, 2007, PCT International Search Report PCT/US06/26313.

Dec. 26, 2007, PCT Written Opinion PCT/US06/26313.

Jun. 17, 2008, PCT International Search Report PCT/US06/30716.

Jun. 17, 2008, PCT Written Opinion PCT/US06/30716.

Aug. 15, 2007, PCT International Search Report PCT/US06/11843.

Aug. 15, 2007, PCT Written Opinion of the ISA PCT/US06/11843.

Jun. 10, 2009, European Search Report EP 06 78 6463.

Jul. 19, 2007, Claims filed by amendment filed Apr. 7, 2009 in U.S. Appl. No. 11/366,397.

Jun. 7, 2007, Claims allowed by Notice of Allowance mailed Dec. 16, 2009 in U.S. Appl. No. 11/488,126.

Claims filed Jan. 22, 2010 in U.S. Appl. No. 12/692,419.

Jun. 7, 2007, Claims filed by preliminary amendment filed Jun. 3, 2008 in U.S. Appl. No. 11/481,789.

English translation of Feb. 5, 2010 Chinese office action in related case, application No. CN 200680045022.3.

Extended European Search Report in EP 09012094, dated Nov. 9, 2009.

US Office Action dated Apr. 16, 2010 in related case U.S. Appl. No. 11/481,789.

English translation of Mar. 11, 2010 Chinese office action in related case, application No. CN 200680045132.X English translation of Mar. 2, 2010 Chinese office action in related case, application No. CN 200780005831.6.

CIPO office action dated May 19, 2010 in related case CA 2,624,620.

Jul. 13, 2010, CIPO office action dated Jul. 13, 2010 in related case CA 2,637,946.

European Search Report dated Aug. 13, 2010 in related case EP 06786463.7.

English translation of Abstract EP 09012094.0.

Supplemental European Search Report dated Feb. 4, 2011 in related application 06789518.

Abstracts of Japan, publication No. 2004098503, published Apr. 2, 2004.

Office action in related application CA 2,624,622, dated Jul. 11, 2011.

English translation of Mar. 11, 2010 Chinese office action in related case, application No. CN 200680045132.X.

Abstracts of Japan, publication No. 2000105786, published Apr. 2000.

* cited by examiner

POS Color Printer Database

40A

| Coupon Image Files 610 | Register Receipt Files 620 |

| Printer Driver Files 630 | Printer/ Head Control 640 |

| Printer Queue Memory 650 |

FIG. 6

COLOR PRINTER TECHNOLOGY

CROSS REFERENCE TO RELATED APPLICATIONS

This application claims priority to provisional application 60/742,909 filed Dec. 7, 2005, entitled "POS Network Including Color Printing and Color Highlighting" and provisional application 60/778,410 filed Mar. 3, 2006, entitled "POS Network Including Color Printing and Color Highlighting" the entire contents of which are incorporated herein by reference.

FIELD OF THE INVENTION

This invention is directed to color printing at the Point Of Sale (POS).

DISCUSSION OF THE BACKGROUND

Herein, RS is an acronym for retail store.
Herein, ID is an acronym for identification.
Herein, CS is an acronym for computer system.
Herein, POS is an acronym for point of sale.
Herein, SVG is an acronym for scalable vector graphics. Scalable Vector Graphics (SVG) is an XML markup language for describing two-dimensional vector graphics, both static and animated, and either declarative or scripted. It is an open standard created by the World Wide Web Consortium.
Herein, SVG means any XML markup language for describing two-dimensional vector graphics.
Herein, CID is an acronym for a customer identification.

Scalable Vector Graphics

Scalable Vector Graphics (SVG) is an XML markup language for describing two-dimensional vector graphics, both static and animated, and either declarative or scripted. It is an open standard created by the World Wide Web Consortium. SVG allows three types of graphic objects: Vector graphic shapes (e.g. paths consisting of straight lines and curves, and areas bounded by them); Raster graphics images/digital images; and text. Graphical objects can be grouped, styled, transformed and composited into previously rendered objects. Text can be in any XML namespace suitable to the application, which enhances searchability and accessibility of the SVG graphics. The feature set includes nested transformations, clipping paths, alpha masks, filter effects, template objects and extensibility. SVG drawings can be dynamic and interactive. The Document Object Model (DOM) for SVG, which includes the full XML DOM, allows straightforward and efficient vector graphics animation via ECMAScript or SMIL. A rich set of event handlers such as "mouseover" and "onclick" can be assigned to any SVG graphical object. Because of its compatibility and leveraging of other Web standards, features like scripting can be done on SVG elements and other XML elements from different namespaces simultaneously within the same web page. SVG images can be saved with gzip compression, in which case they may be called "SVGZ files".

Color Mapping

The RGB color model is an additive model in which red, green and blue (often used in additive light models) are combined in various ways to reproduce other colors. The name of the model and the abbreviation "RGB" come from the three primary colors, Red, Green and Blue.

CMYK (sometimes spelled YMCK or CYM) is a subtractive color model used in color printing. This color model is based on mixing pigments of the following colors in order to make other colors: C=cyan; M=magenta; Y=yellow; K=key (black). The mixture of ideal CMY colors is subtractive (cyan, magenta, and yellow printed together on white result in black). CMYK works through light absorption. The colors that are seen are from the part of light that is not absorbed. In CMYK, magenta plus yellow produces red, magenta plus cyan makes blue and cyan plus yellow generates green.

Color models do not define what is meant by each color, and the results of mixing them are not exact unless the exact spectral make-up of the the colors are defined. The color model then becomes an absolute color space, such as sRGB or Adobe RGB. An absolute color space is a color space in which colors are unambiguous, where they do not depend on any external factors. A popular way to make a color space like RGB into an absolute color is to define an ICC profile, which contains the attributes of the RGB. This is not the only way to express an absolute color, but it is the standard in many industries. RGB colors defined by widely accepted profiles include sRGB and Adobe RGB. The process of adding an ICC profile to a graphic or document is sometimes called tagging; tagging therefore marks the absolute meaning of colors in that graphic or document. The International Color Consortium (CCC) was formed in 1993 by eight industry vendors in order to create a universal color management system that would function transparently across all operating systems and software packages.

sRGB color space, or standard RGB (Red Green Blue), is an RGB color space created cooperatively by Hewlett-Packard and Microsoft Corporation. It has been endorsed by the W3C, Exif, Intel, Pantone, Corel, and many other industry players. It is also well accepted by Open Source software such as the GIMP, and is used in proprietary and open graphics file formats such as SVG.

sRGB defines the red, green, and blue primaries as colors where one of the three channels is at the maximum value and the other two are at zero. In CIE xy chromaticity coordinates red is at [0.6400, 0.3300], green at [0.3000, 0.6000] and blue is at [0.1500, 0.0600] and the white point is the D65 white point at [0.3127, 0.3290]. sRGB has been criticized for poor placement of these primary colors. If you restrict the indexes to the 0-to-1 range you are unable to address outside the gamut (the triangle produced by them), which is well inside the set of visible colors to a human.

sRGB also defines a non-linear transformation between the intensity of these primaries and the actual number stored. The curve is similar to the gamma response of a CRT display. It is more important to replicate this curve than the primaries to get correct display of an sRGB image. This non-linear conversion means that sRGB is a reasonably efficient use of the values in an integer-based image file to display human-discernable light levels.

The ICC specification allows for fidelity of color when moved between applications and operating systems, from the point of creation to the final print. The main emphasis of the ICC is to define a format for ICC Profiles, which describe the color attributes of a particular device or viewing requirement by defining a mapping between the source or target color space and a profile connection space (PCS). This PCS is either L*a*b* or CIE XYZ color space. Mappings may be done using tables, to which interpolation is applied, or through a series of parameters for transformations.

To see how this works in practice, suppose we have a particular RGB and CMYK color space, and want to convert from this RGB to that CMYK. The first step is to obtain the two ICC profiles concerned. To perform the conversion, each RGB triplet R,G,B is first converted to the PCS using the RGB profile. If necessary the PCS is converted between L*a*b* and CIE XYZ, a well defined transformation. Then the PCS is converted to the four values of C,M,Y,K required.

Formula for converting from RGB to CMYK colors are well known. See for example the conversion formula specified at http://en.wikipedia.org/wiki/CMYK_color_model.

Color Printers and Printer Media

Ink from a color printer is typically shot at the paper, propelled to the paper, in shots. Each shot of ink of the same color has the same volume of ink. Thus, shots and volume of ink are synonymous. Color printer drivers typically render print files to a flat file for printing.

Thus, printer driver software would render a single flat print file from an SVG file and the multiple image files the SVG file referenced.

Printers print to sheet or tape material, typically a paper. These materials have the following quantifiable properties: basis weight; caliper; thickness; density; tensile strength; smoothness; brightness/whiteness; gloss; opacity; tearing strength; porosity; air permeance; elasticity; ink bleed; and abrasion. These quantities may characterize, amongst other things, hydrophilic versus hydrophobic properties, fiber orientation, density, and composition.

Most color printers print based upon a CMYK standard, and they internally convert image data in RGB format to a CMYK format prior to printing. Most if not all color printer drivers do not now incorporate the SVG standard, that is, they do not render SVG files.

DISCLOSURE OF THE INVENTION

Objects of the Invention

It is one object of the invention to reduce the amount of ink used to print certain image objects.

It is another object of the invention to reduce the amount of network data transfer required to print marketing information at the POS.

It is another object of the invention to provide color printing of purchase transaction information and marketing information at the POS.

BRIEF DESCRIPTION OF THE DRAWINGS

FIG. 6 a schematic of a data structure included in POS color printer database 40A.

BRIEF SUMMARY OF THE INVENTION

Figure 1:
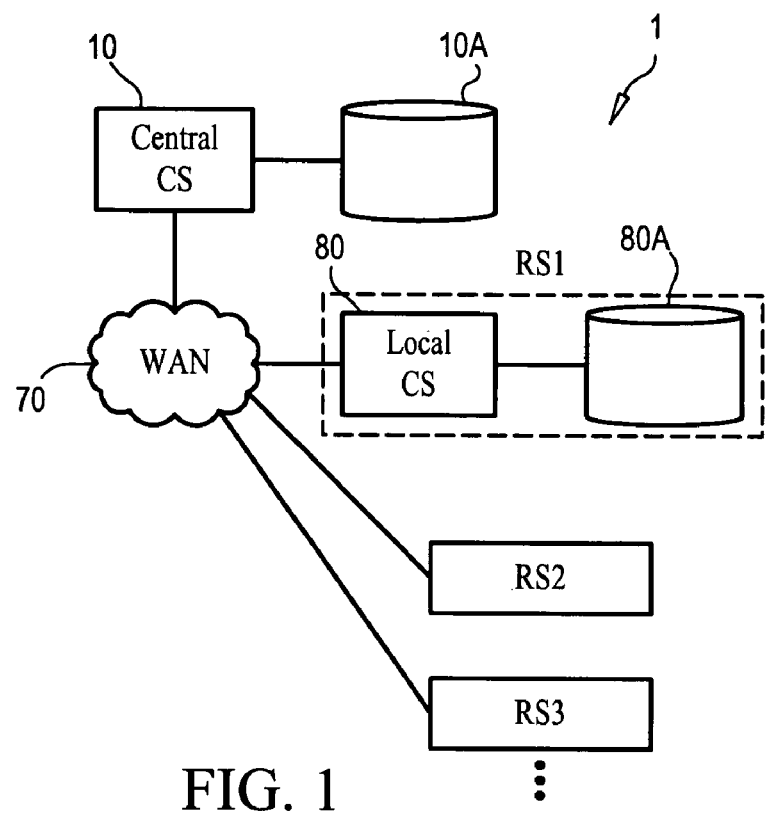
FIG. 1 is a schematic view of a network computer system 1.

These and other objects are provided by a novel network computer system, including a central CS remote from a RS, a local CS local to the RS, and a POS color printer in the RS. A database of image object files is stored local to the RS. A database of SVG files is stored by the central CS. At least one of the SVG files references an image object in the image objects database. Each such SVG file defines vector locations and sizes (scale) for the image objects it references. Each such SVG file and the files it references defines data necessary to print a corresponding marketing communication.

The central CS transmits in association with a CID at least one SVG file to the local CS. When the local CS subsequently recognizes a purchase transaction is occurring that involves that CID, the local CS employs the SVG file associated with the CID to print the corresponding marketing communication along with the register receipt for the purchase transaction.

The central CS preferably also stores the image object database or library including version of the image objects, versions of each SVG file, and the latest version information for versions to be sent to each RS. Each RS may receive different image objects, SVG files, and versions thereof. The central CS generates and transmits to each local CS image object files database updates for image object versions the corresponding RS will need to print new or updated SVG files referencing those new or updated image objects.

The image objects database would for example include background image field files, such as various color field files, that are image field components of potentially more than one coupon defined using a SVG file. For example all coupons for all products of a specified manufacturer may use a certain background image file.

The central CS implements rules to determine marketing communications to associate with each CID. The central CS associates the corresponding SVG files with the CID. Image object files referenced by the SVG files are stored in the local CS of the retail store. Recognition of the CID in a transaction at the local store results in a POS color printer printing the marketing communication based upon the SVG file associated with that CID.

Ink used in color printing is minimized by printing only the minimum number of ink shots of the various colors (Cyan, Magenta, Yellow, and optionally Black) required to result in a print have that desired color. Typically, the four different ink colors are used to generate a print color by shooting shots of each color of ink at paper. Printer driver software typically instructs the printer to shoot more shots of each color of ink than the minimum number of ink shots of the various colors required to result in a print of a specified color.

The minimum number of ink shots of each color that results in a particular print color (herein after referred to as the minimum number of ink shots) may depend upon printer driver software, printer brand, printer paper properties, and classification of the image object's properties including whether it is background, foreground, text, and quantification of the image object in print dimensions including length in x and y coordinates and total area.

As an example, assume a digital representation of a dark magenta background may indicate particular conventional color inkjet printer driver to use 20 ink shots per pixel. The minimum number of ink shots required to produce that color in print is determined, by examination of color of printed matter, for text to be only 5 magenta ink shots, in small cross section foreground material to be only 8 magenta ink shots, and in large area canvass background to be only 12 magenta ink shots.

The invention provides for generating a modified image object instead of an original image object, and then printing the modified image object, so that only the minimum number of ink shots are used for each point in the print to achieve the specified print color. The modified image object contains data defining each original color in the original image object with data defining a modified color. The data defining the modified color is data that results in printer driver software printing the minimum number of ink shots that result in print of the original color, or a number of ink shots of each color nearly equal to the minimnum number of ink shots that result in print of the original color.

Returning to the example, the invention provides a modified image object background that replaces the original magenta color data with data for a lighter shade of magenta that will result printing only the 12 magenta ink shots per pixel required to reproduce the desired print color.

Not all combinations of shots of cyan, magenta, yellow, and black exist as colors in a color map. It may be that some sets of minimum number of ink shots does not exactly correspond to colors. In that case, a color whose set of ink shots is most nearly equal to the set of minimum number of ink shots may be selected to correspond thereto. Most nearly equal may be determined for example by choosing the color having the smallest least squares value of the differences of the number of ink shots for CYMK in the set of minimum number of ink shots and the set of ink shots associated with each color in the CYMK color space.

The minimum number of CMYK ink shots may be determined for a set of measured colors. An interpolation and/or extrapolation of the minimum number of ink shots from the set of measured colors may then be used to determine a minimum number of ink shots for all colors in the color space. The presently preferred color is an RGB color space that has 256,000 digital color definitions, each for a different color. A color in the color space (that is, a digital representation of a color) nearly equal to the minimum number of ink shots may be selected in various ways. For example, the color may be selected by determining which color in the color space has the minimum least squares difference to the color in the color space specified by the minimum number of ink shots, and selecting that color. Since most color printers print based upon CMYK software must convert the RGB datum to CMYK datum at or prior to transmission of data to the printer. Current printers typically perform this RGB to CMYK conversion internally. Thus, it is sufficient to define colors in RGB that correspond to minimum number of ink shots for an original image object digitally defined in an RGB color space.

The foregoing image object database or library is formed by starting with a set of original image objects (preferably represented using RGB) and generating modified image objects (preferably represented using RGB) as specified above. For each original image object, there may be a plurality of modified image objects or versions, each of which is associated with meta data. The meta data may define a corresponding paper properties or paper type, printer type, print driver, dimensions and z position of the image object. (Thus, each original object may be associated with a set of original image object files each of which differs in one or more of the associated properties.) The central CS tracks SVG files specifying marketing communication markup data, associated with each RS, determines what subset of the image objects database that RS requires to print its SVG files, and transmits that subset of image objects to that RS's local CS.

The inventors have found that the minimum number of ink shots required to print a large area may exceed the number of ink shots required to print the same color to a small area, and the minimum number of ink shots required to print lighter colors exceeds the minimum number of ink shots to print darker colors.

The image objects in the image objects database are components of images included in marketing communications printed at the POS. The marketing communications may be coupons. The marketing communications may include image elements for manufacturer logs, brand logos, product logos, product pictures, backgrounds, highlights, watermarks, and coupon or communication borders such as peripheral regions of rectangles.

The amount of ink required depends in part upon the lateral (in the plane of the paper) bleed of ink—how far it spreads. Hence, one obvious variation would be to skip printing at certain pixels, such as alternate pixels, if lateral bleed in a specified paper were sufficient so that ink from alternate pixels would merge in the paper to reproduce the desired color at the non printed pixel locations. In conjunction with that, printing could optionally include all edge pixels, to prevent fuzzy edging. Finally, black ink for printing bar codes could be replaced by printing bars in blue or blue and black.

DETAILED DESCRIPTION OF THE EMBODIMENTS

FIG. 1 schematically shows computer network system 1 including central CS 10, central CS database 10A, local CS 80 for retail store RS1, and wide area network (WAN) 70. In addition, FIG. 1 shows WAN 70 connecting to CSs for retail store RS2, etc.

FIG. 1 shows RS1 (retail store 1) in dashed lines enclosing local CS 80 schematically indicating that local CS 80 operates to support operations of retail store 1, including logging transaction data, performing accounting functions, and providing register receipts at POSs in RS1. RS2, RS3, etc. indicate the existence of additional retail stores having local CSs similar to local CS 80 and all enabled to communicate with central CS 10 via WAN 70.

Preferably, WAN 70 is a packet switched network employing TCP/IP. Preferably, WAN 70 is the Internet. WAN 70 may a private network.

Preferably, each CS includes at least one digital central processing unit, memory, and operating system software. Lines between CS, databases, and WAN 70 each indicate a means for data transmission, such as network cards, data cables, and wireless transmission and reception hardware. In all embodiments, databases shown having a line connecting to a CS indicate that the CS controls read and write access to the database.

Local CS 80 and central CS 10 can communicate via WAN 70.

Figure 2:
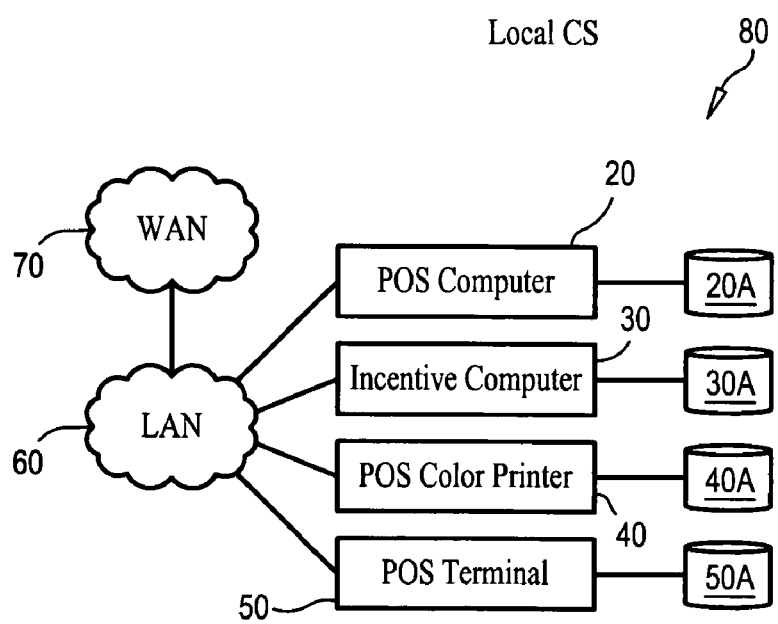
FIG. 2 is a schematic view of an embodiment of local computer system of FIG. 1.

FIG. 2 shows one embodiment of local CS 80 for RS1. Local CS 80 includes POS computer 20, POS computer database 20A, incentive computer 30, incentive computer database 30A, POS color printer 40, POS color printer database 40A, POS terminal 50, and LAN 60. In RS1, each POS terminal has an associated POS color printer nearby. RS1 may include a plurality of POS terminals and corresponding POS color printers adjacent each POS terminal.

POS computer 20 receives transaction data over LAN 60 from each POS terminal 50. POS computer 20 functions to track product inventory stock, product item costs, sales proceeds, and finances for RS1, storing relevant information in POS computer database 20A.

Incentive computer 30 functions to determine when, and optionally in some cases, what, marketing communications POS color printer 40 prints. Incentive computer 30 preferably also stores in incentive computer database 30A transaction data for transactions that occurred at the POSs in RS1, and also stores marketing information in association with CIDs. Preferably, Incentive computer database 30A stores SVG rendering software including an SVG library enabling incentive computer 30 to render into a single image object the individual image objects and text identified in an SVG file. Incentive computer 30 would then transmit that single image object file in Windows (trademark) Graphic Device Interface (GDI) format to POS color printer 40.

POS color printer 40 prints marketing communications and preferably also prints register receipts. Each or both may be printed in color. POS color printer database 40A includes printer driver software, preferably including RGB to CMYK conversion software. Optionally, POS color printer database 40A includes SVG rendering software including an SVG library enabling POS color printer 40 to both render into a single image object the individual image objects and text identified in an SVG file, and then print SVG file.

In a currently preferred embodiment, POS color printer 40 driver software includes code for interpreting Windows (trademark) Graphic Device Interface (GDI) format files, and for converting in those files RGB image data to CMYK image data.

POS terminal 40 preferably includes transaction data input mechanisms, such as scanners for scanning UPC codes and customer identification cards, and a keyboard. It may also include customer biometric data readers and a microphone. POS terminal 40 functions to identify the beginning and end of purchase transactions, to obtain a CID and product identifications for products being purchased in association with the CID. POS terminal 40 also transmits the transaction data (product identifiers, CID, POS ID, etc) over LAN 60 to POS computer 20 and preferably incentive computer 30. POS terminal 40 may also function to look up pricing and discounting information, or to request that information from POS computer 20 via LAN 60.

LAN 60 preferably includes one or more digital network switches enabling it to route packets containing destination address information to the appropriate network address.

In one alternative embodiment, POS computer 20 may perform all functions associated herein with incentive computer 30 in which case POS computer database 20A includes the data structures disclosed herein in association with database 30A.

POS computer database 20A or incentive computer database 30A may store all data disclosed herein for POS color printer database 40A, in which case POS computer 20 or incentive computer 30 performs the processing functions disclosed herein for printer 40.

POS color printer 40 may be connected directly to POS computer 20 instead of via LAN 60.

In other embodiments, POS color printer driver software and SVG file rendering software may reside in any database in local CS 80, and may be invoked by any of the computers in local CS 80. Other modifications of the local network architecture are obvious to one skilled in the art that preserve the existence of the WAN connection between the central CS and one or more local CS each associated with a RS.

Figure 3:
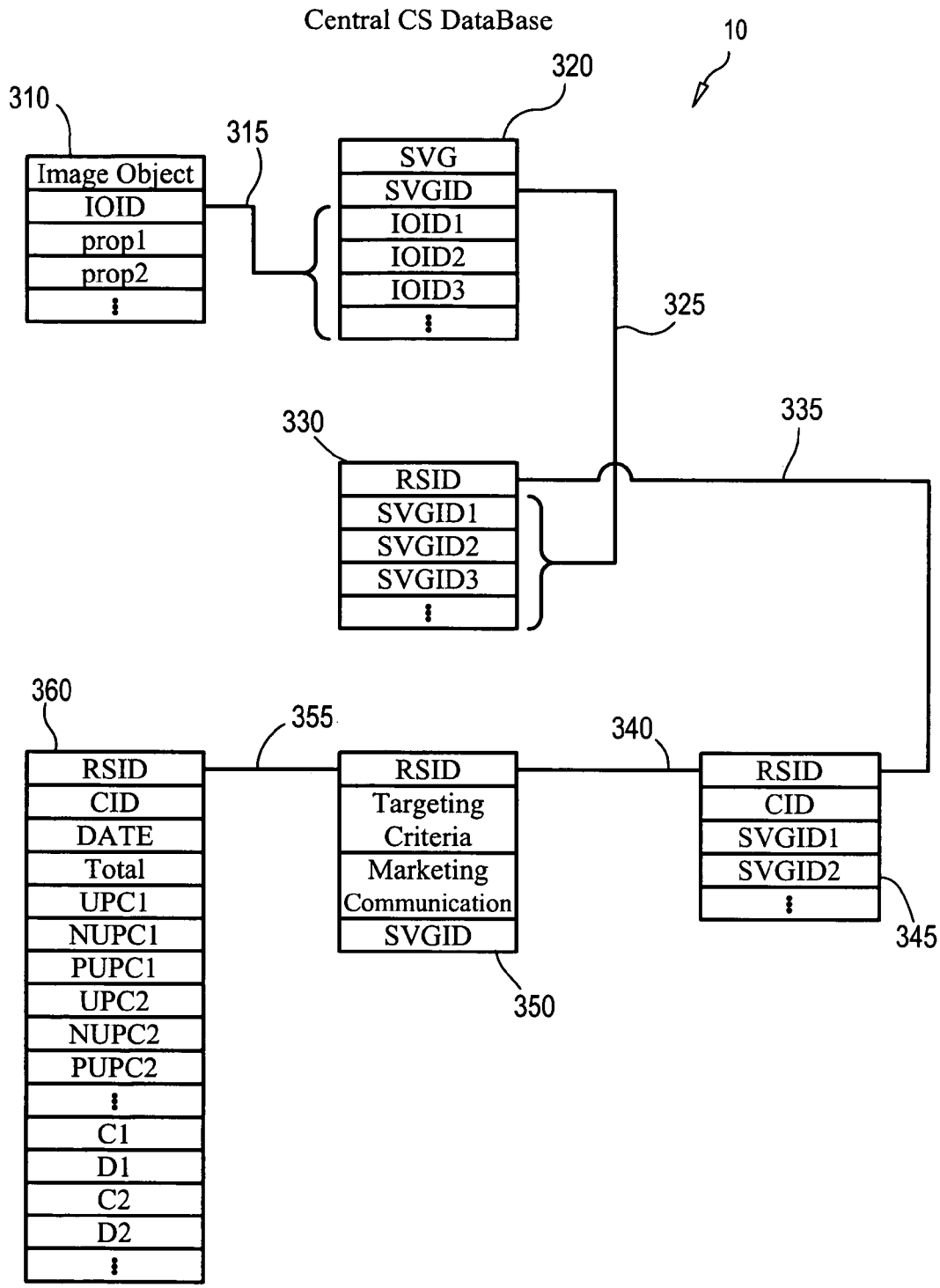
FIG. 3 is schematic of a data structure included in central CS database 10A.

FIG. 3 shows a relational database embodiment of central CS database 10A. However, other data structures may accomplish the same result, providing the same or similar data relationships.

FIG. 3 shows a schema in table design views of tables 310, 320, 330, 340, 350, and 360, and table relationships 315, 325, 335, 345, and 355. Relationships 315 and 325, are one to many relationships. Relationships 335, 345, and 355 are one to one relationships.

Image objects table 310 stores image objects and their properties. Table 310 includes fields for image object, Image object identification (IOID), and image object properties (prop1, prop2, etc.). Herein all "ID" fields are some form of identification for associated data. Properties of the image object include intended layer position (foreground, background), image dimensions, color or colors. The image objects contained in 310 preferably are modified image objects for an original image object, modified as described herein to reduce the amount of ink used to generate a print similar in color to the original image object.

Relationship 315 indicates that Image Object ID field IOID in 310 contains the same type of data (image object identification data) as IOID fields in table 320.

Marketing communications table 320 stores in associated fields an SVG and the image object that SVG references. Table 320 has fields for SVG, SVGID, and IDs of associated image objects IOID1, IOID2, IOID3, etc.

Table association 325 indicates that data in the SVGID field in table 320 is the same type of data as data in the SVGID1, SVGID2, SVGID3, etc., fields, in table 330.

Table 330 stores IDs of those SVGs associated with each RS. That is, table 330 stores for each RS IDs of only those SVGs associated with CIDs associated with those stores. The number of SVGs associated with any particular RS may be a small subset of all SVGs stored by central CS 10 in database 10A.

Table 330 associates fields for RS identification (RSID) with fields for a set of SVG identifications, SVGID1, SVGID2, SVGID3, etc.

Targeting table 340 contains targeted marketing communication trigger data. Table 340 stores in association with a CID marketing communications for the corresponding customer (SVG files) and the retail store ID associated with purchases by the corresponding customer. The data in table 340 is transmitted to local CS 80. Local CS 80 can then trigger rendering of an SVG and then printing of the marketing communication defined by the rendered SVG file. Local CS 80 can do this during a transaction when the local CS matches a CID entered at POS terminal with a CID received from central CS 10.

Targeting determinations table 350 contains data that central CS 10 uses to determine what marketing communications to target to each CID. Table 350 contains fields for RSID, targeting criteria, marketing communication, and SVGID. Each marketing communication is associated with an SVG file. Each marketing communication is targeted for deliver to a particular CID only if targeting criteria are met for that CID. Targeting criteria frequently depend upon product purchases associated with that CID in some prior time period, which is the data stored in product purchase history table 360. Thus, central CS 10 may apply the targeting criteria in table 350 to data associated with a CID in product purchase history table 360 to generate data in table 340.

Product purchase history table 360 contains field for storing in association with one another RSID, CID, date, total (currency amount total for a purchase transaction), and product identifier, quantity of that product, and price of that product (UPC1, NUPC1, PUPC1, respective, and UPC2, NUPC2, PUPC2, respective, etc,), and coupon identifiers and coupon discount amounts (C1, D1, respectively, C2, D2, respectively, etc.).

Generally speaking, tables 310, 320, 330, enable central CS to track SVGs and image objects files previously transmitted to each RS and therefore to determine and transmit to each RS SVG files and image objects data not previously transmitted to that store but currently associated with that RS via table 340. Tables 340, 350, and 360, enable central CS to associate with each CID targeted marketing communications (and corresponding SVG files) for consumers that have purchased in the RS.

An example of associated (1) targeting criteria and (2) marketing communication are (1) existence of UPC for a quart of milk in an immediately preceding 30 day period from the current time and (2) a coupon for a particular dry cereal product.

Figure 4:
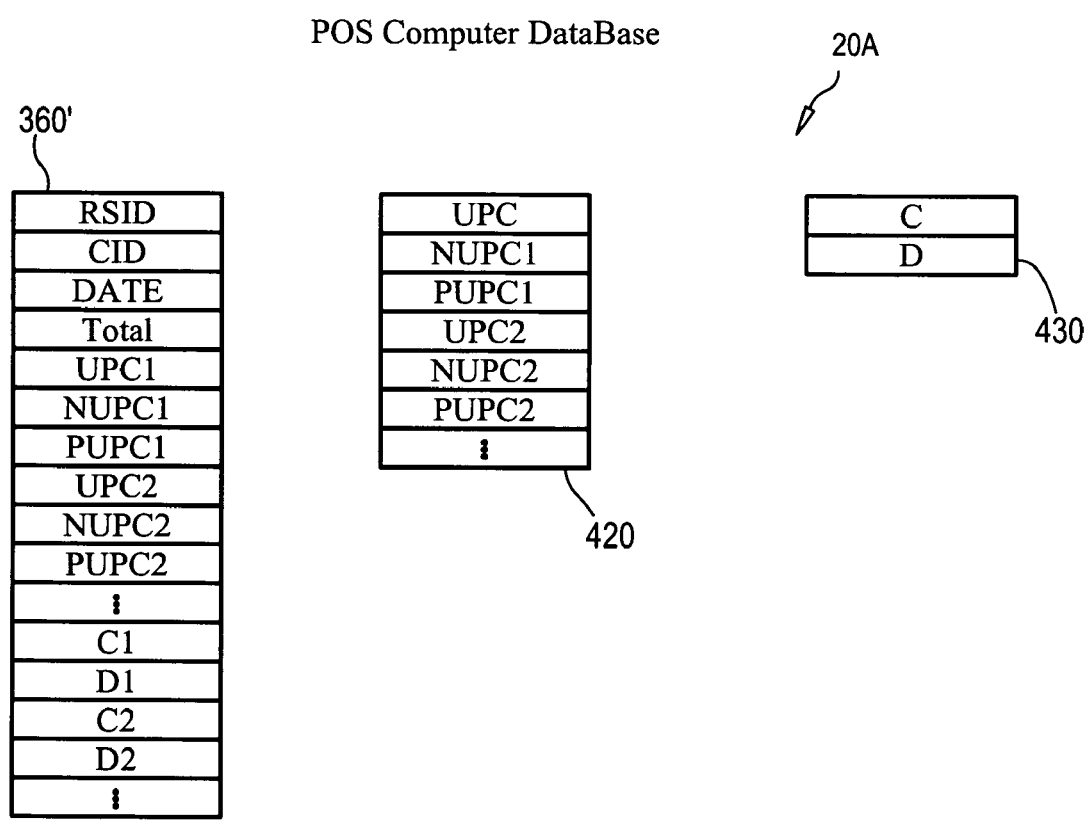
FIG. 4 is a schematic of a data structure included in POS computer database 20A.

FIG. 4 shows a relational database embodiment of POS computer database 20A. POS computer database 20A includes RS product purchase history table 360', inventory stock table 420, and coupon discount table 430.

RS product purchase history table 360' has the same data fields as table 360. However, RS product purchase history table 360' preferably only stores product purchase history for transactions that occurred in RS1. Inventory stock table 420 stores by product identifier (UPC code) the number of product items in stock. Coupon discount table 430 stores coupon identification C in association with a discount to include for a purchase including the coupon identification. In operation, the local CS 80 may use the coupon discount table to determine discounts to apply to a customer's purchase transaction. See the data for coupons and their discounts shown in table 360'.

Figure 5:
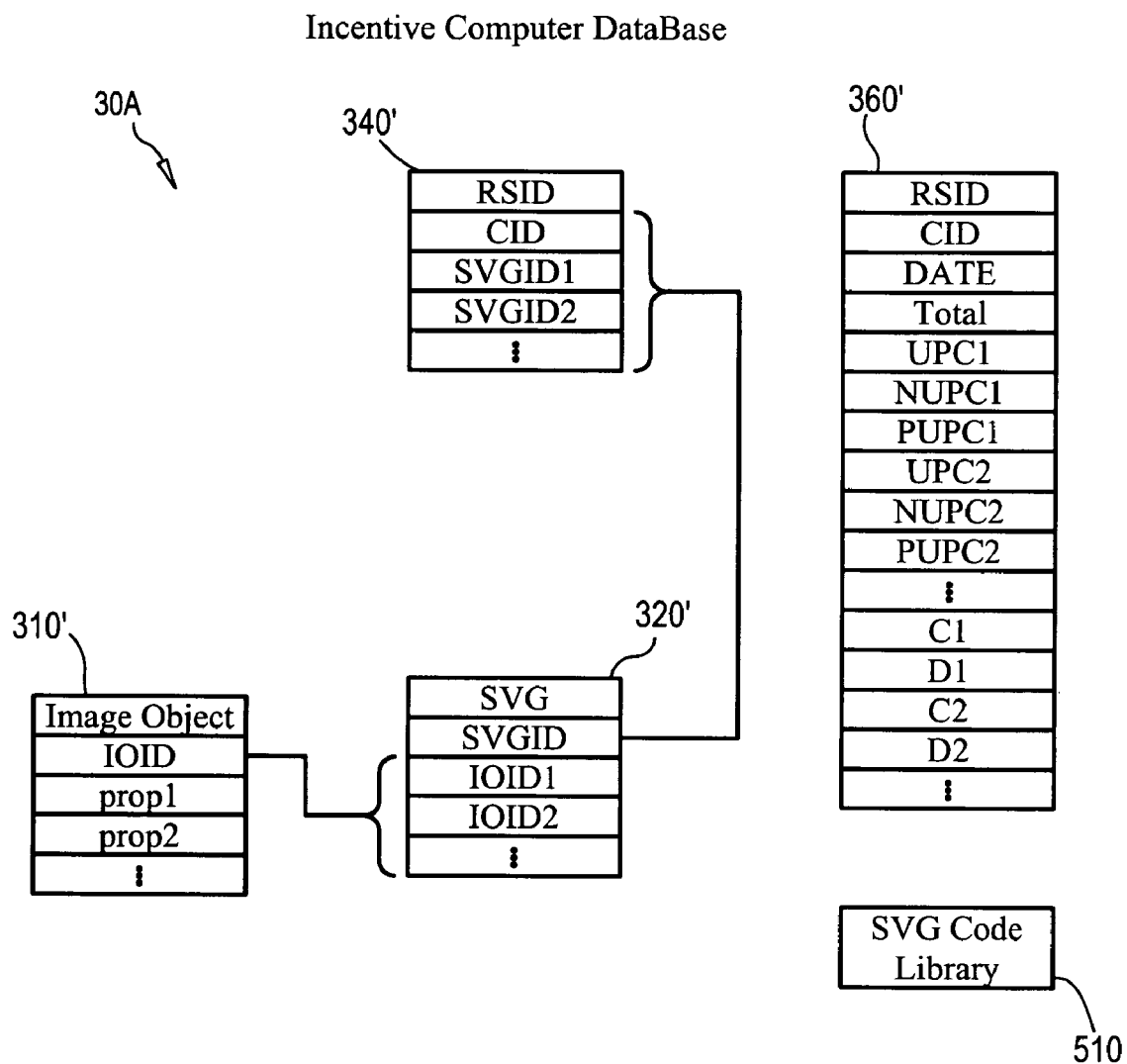
FIG. 5 a schematic of a data structure included in incentive computer database 30A.

FIG. 5 shows a relational database embodiment of incentive computer database 30A including RS image objects table 310', Marketing communications table 320', RS targeting table 340', RS product purchase history table 360', and SVG code library 510. The RS tables 310', 320', 340', and 360' have the same data structure as tables 310, 320, 340, and 360. However, tables 310', 320', 340', and 360' store only data from or for RS1. SVG code library 510 is software code capable of rendering SVG files to generate a single image file as specified by the SVG file, including any image object files referenced by the SVG file.

Preferably, incentive computer 30 determines when a CID read at POS terminal 50 matches a CID stored in targeting table 340', responds by generating an image file in Windows GDI format for an associated marketing incentive, and transmitting that file to POS color printer 40.

Preferably, incentive computer 30 periodically or a-periodically transmits new data for RS1 in table 360' not yet transmitted to central CS 10 to central CS 10.

FIG. 6 shows contents of POS color printer database 40A. This data preferably includes coupon image files data 610, register receipt data 620, printer driver 630, printer/print head control 640, and printer queue memory 650.

Each file in coupon image files data 610 includes image data for one or more marketing communications, typically coupons. Register receipt data 620 includes data for printing descriptions and quantities and prices of items purchased, discounts applied to the purchase, and transaction currency total.

Alternatively, coupon image files data 610 may be a single image file containing any and all marketing communications data.

Alternatively, both coupon image files data and register receipt data may be merged by local CS 80 into a single file, such as a file in Windows (trademark) GDI format, prior to transmission to POS color printer 40. In this case, register receipt data 620 and coupon image files data 610 are a single merged data file in POS color printer database 40A.

Printer driver 630 preferably converts RGB color data to CMYK or CMY color data for printing, and orders the data into a data stream for transmission to printer queue memory. Printer queue memory 650 stores in sequence commands to issue to print heads (structures that transmit ink to paper) and to paper position controllers, such as paper rollers.

Optionally, POS color printer database 40A also includes a separate printer/head control 640 for rewinding printer paper to enable consecutive printing by more than one print head with at least one print head facing each side of a paper roll.

In embodiments in which local CS 80 sends to POS color printer 40 more than one file for printing for a transaction, such as a register receipt file and one or more marketing communication, business rules may be implemented to ensure reliability and minimize transaction time. For example, POS color printer 40 may implement time out code such that it will print a register receipt file after a specified time has elapsed, such as 2 seconds, after receipt of that file, if it has not by then received coupon image files data. In addition, it may include code for determining print length of register receipt information and print length of marketing communication, for printing register receipt or marketing communication on one side of paper, rewinding the paper by about the length of the first print, and then printing to the second side of the paper for the other print.

Figure 7:
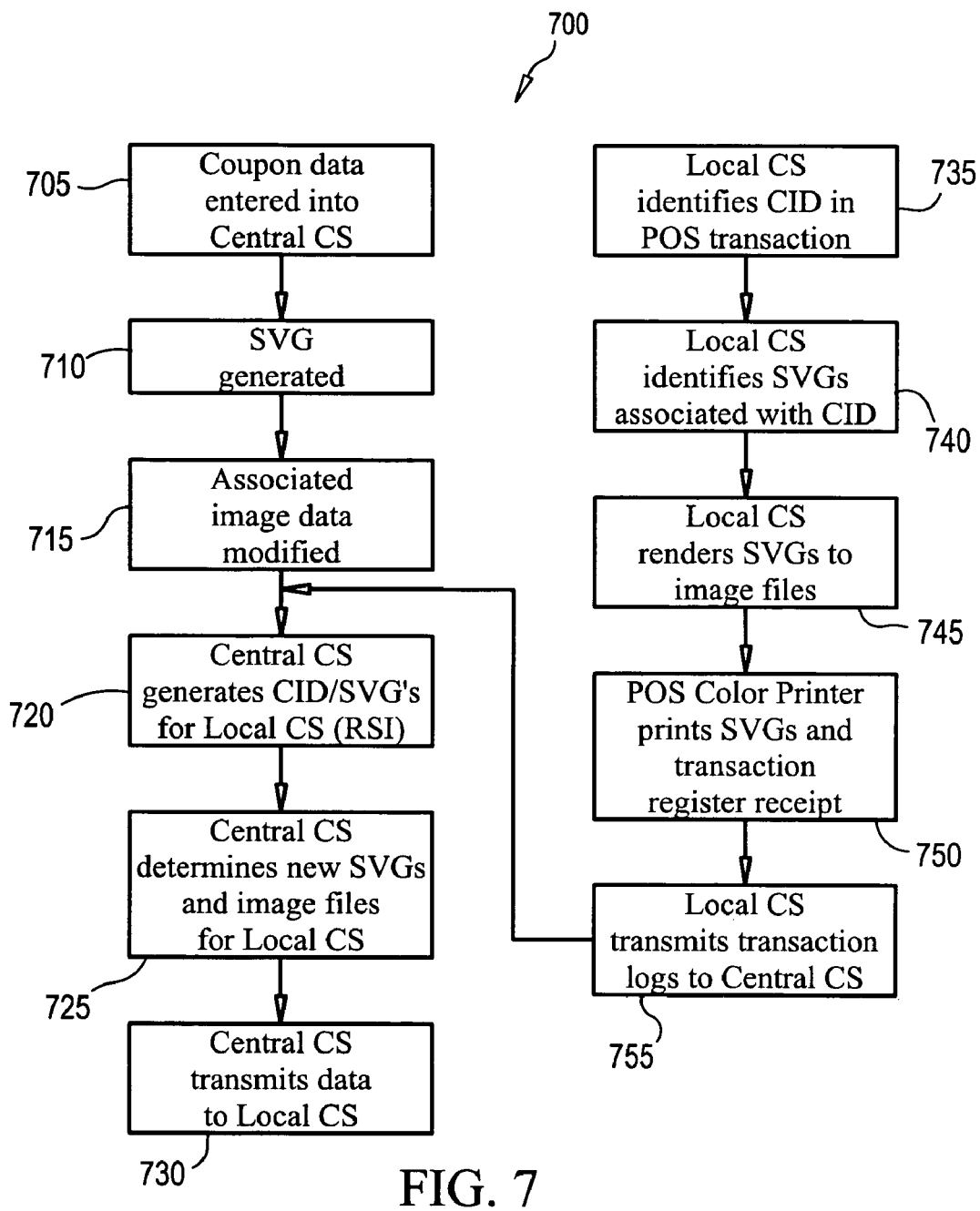
FIG. 7 is a flow chart showing an overview of a method of use of network CS 1.

FIG. 7 shows flow chart 700 showing steps occurring in network CS 1.

In step 705, central CS 10 receives coupon data, which may include image data or image files.

In step 710, central CS 10 generates SVG files from the coupon data.

In step 715, central CS 10 generates modified image data for the image data or image files associated with each SVG file.

In step 720, central CS 10 associates certain SVG files with certain CIDs local CS 80 (RS1). The CIDs are ones previously received from local CS 80. The SVG files are those that meet targeting criteria applied to those CIDs.

In step 725, central CS 10 determines which of the SVG and associated image object files have not previously been sent to RS1. It may do this by filtering the SVG newly associated with CIDs for RS1 against a database of SVGs previously transmitted to RS1. For each new SVG for RS1, there may be corresponding new image files for RS1.

In step 730, central CS 10 transmits data to local CS 80. This data may include the new CIDs and associated SVG and image files for RS1.

In step 735, local CS 80 identifies a CID as being involved in a transaction at POS terminal 50. In the preferred embodiment, this function is performed by incentive computer 30.

In step 740, local CS 80 identifies any SVG files stored in local CS 80 in association with that CID. In the preferred embodiment, this function is performed by incentive computer 30.

In step 745, local CS 80 renders to image files the associated SVGs. In the preferred embodiment, this function is performed by incentive computer 30.

In step 750, POS color printer 40 prints the rendered SVGs and register receipt for the transaction.

In step 755, local CS 80 transmits transaction logs to central CS 10.

In step 750, local CS 80 renders the SVGs and their associated image files to a single image file per SVG or set of SVGs. These image files may saved in Windows (Trademark) GDI format.

The invention claimed is:

1. A computer implemented method of reducing a volume of ink used by a color printer in printing a colored image, comprising:
   reading, with a computer, from computer memory a first color value of a pixel of an original colored image object, the color printer configured to use a first volume of ink to print a first color based on the first color value;
   determining, with the computer, a second volume of ink sufficient for the color printer to print the first color based on whether the original colored image object has a property indicating it is printed as background or foreground, the second volume of ink less than the first volume of ink;

determining, with the computer, a second color value different from the first color value based on the second volume, the color printer configured to use the second volume of ink to print the first color based on the second color value; and generating, with the computer, a modified colored image object from the original image object based on the second color value.

2. The method of claim 1, wherein the first color value comprises at least one of a value for red, a value for green, or a value for blue and the second color value comprises at least one of a value for red, a value for green, or a value for blue.

3. The method of claim 2, wherein the color printer is configured to convert red, green, and blue color values to at least cyan, magenta, and yellow color values.

4. The method of claim 1, further comprising:
reading, with the computer, first color values for a plurality of pixels of the original colored image object;
determining, with the computer, volumes of inks required for the color printer to print the first color values for the plurality of pixels of the original colored image object;
determining, with the computer, second volumes of inks sufficient for the color printer to print the first colors for the plurality of pixels of the original colored image object;
determining, with the computer, second color values based on the second volumes of ink; and
generating, with the computer, the modified image object from the original image object based on the second color values.

5. The method of claim 1, wherein determining a second volume of ink is based on lateral ink bleed of print paper.

6. The method of claim 1, wherein determining a second volume of ink is based on printer driver for the printer.

7. The method of claim 1, wherein determining a second volume of ink is based on at least one dimension of the original colored image object.

8. The method of claim 1, wherein determining a second volume of ink is based on whether the original colored image object has a property indicating it is printed as foreground, such that the second volume of ink for printing the original colored image object as foreground is different than the second volume of ink for printing the original colored object image printed as background.

9. The method of claim 1, wherein the second volume of ink for printing the original colored image object as foreground is different than the volume of ink for printing the original colored object image printed as background.

10. The method of claim 1, further comprising printing the modified colored image object.

11. The method of claim 1, wherein determining a second volume of ink is based on whether the original colored image object has a property indicating it is printed as background, such that the second volume of ink for printing the original colored image object as background is different than the second volume of ink for printing the original colored object image printed as foreground.

12. The method of claim 1, the method further comprising:
receiving, with the computer, a Scalable Vector Graphics (SVG) file associated with at least one of the original image object or the modified image object; and
storing the received SVG file.

13. A system for reducing a volume of ink used by a color printer in printing a colored image, comprising:

a storage system;
a color printer configured to use a first volume of ink to print a first color based on a first color value of a pixel of an original colored image object; and
a processor configured to:
read from the storage system the first color value;
determine a second volume of ink sufficient for the color printer to print the first color based on whether the original colored image object has a property indicating it is printed as background or foreground, the second volume of ink less than the first volume of ink;
determine a second color value different from the first color value based on the second volume, the color printer configured to use the second volume of ink to print the first color based on the second color value; and
generate a modified colored image object from the original image object based on the second color value.

14. A computer implemented method of reducing a volume of ink used by a color printer in printing a colored image, the method comprising:
reading, with a computer, from computer memory a first color value of a pixel of an original colored image object, the color printer configured to print a first volume of ink to print a first color based on the first color value;
determining, with the computer, a second volume of ink sufficient for the color printer to print the first color, the second volume of ink less than the first volume of ink;
when the second volume of ink does not exactly correspond to a color value in a color map, determining, with the computer, a second color value by selecting a color value in the color map for which the color printer prints approximately the second volume of ink; and
generating, with the computer, a modified colored image object from the original image object based on the second color value.

15. The method of claim 14, wherein selecting a color value in the color map for which the color printer prints approximately the second volume of ink comprises:
choosing from the color map a color value having a smallest least squares value of differences between a volume of ink the color printer is configured to use to print the color value and the second volume of ink.

16. The method of claim 14, further comprising:
reading, with the computer, from computer memory at least one image object property of the original colored image object, wherein determining a second volume of ink sufficient for the color printer to print the first color is based at least in part on the at least one image object property.

17. The method of claim 16, wherein the at least one image object property is referenced by a scalable vector graphic (SVG) file.

18. The method of claim 16, wherein the at least one image property comprises a dimension of the original colored image object.

19. The method of claim 16, wherein the at least one image property comprises a property indicating that the original color image object is foreground.

20. The method of claim 16, wherein the at least one image property comprises a property indicating that the original color image object is background.

21. The method of claim 16, wherein the at least one image property comprises a property indicating that the original color image object defines text.

22. The method of claim 14, further comprising:
reading, with the computer, first color values for a plurality of pixels of the original colored image object;
determining, with the computer, volumes of inks required for the color printer to print the first color values for the plurality of pixels of the original colored image object;
determining, with the computer, second volumes of inks sufficient for the color printer to print the first colors for the plurality of pixels of the original colored image object;
determining, with the computer, second color values based on the second volumes; and
generating, with the computer, the modified image object from the original image object based on the second color values.

23. The method of claim 14, wherein the determining a second volume of ink is based at least in part upon a printer driver for the printer.

24. The method of claim 14, further comprising:
printing the colored image including the modified colored image object.

25. The method of claim 12, wherein the SVG file is associated with a coupon, the method further comprising:
printing the coupon based on the SVG file.

26. The method of claim 25, wherein the SVG file is associated with a consumer identification, the method further comprising:
recognizing that the consumer identification is involved in a transaction; and
printing the coupon based on the recognition and the association between the consumer identification and the SVG file.

27. The method of claim 25, the method further comprising:
printing a register receipt with the coupon.

28. The method of claim 27, the method further comprising:
merging the register receipt and the coupon into a single file for printing.

29. The method of claim 27, the method further comprising:
printing the register receipt on one side of a paper; and
printing the coupon on another side of the paper.

30. The method of claim 29, the method further comprising:
printing the register receipt or the coupon on its respective side of the paper;
rewinding the paper; and
printing the other of the register receipt or the coupon on its respective side of the paper.

31. The system of claim 13, wherein the first color value comprises at least one of a value for red, a value for green, or a value for blue and the second color value comprises at least one of a value for red, a value for green, or a value for blue.

32. The system of claim 31, wherein the color printer is configured to convert red, green, and blue color values to at least cyan, magenta, and yellow color values.

33. The system of claim 13, wherein the processor is further configured to:
read first color values for a plurality of pixels of the original colored image object;
determine volumes of inks required for the color printer to print the first color values for the plurality of pixels of the original colored image object;
determine second volumes of inks sufficient for the color printer to print the first colors for the plurality of pixels of the original colored image object;
determine second color values based on the second volumes of ink; and
generating, with the computer, the modified image object from the original image object based on the second color values.

34. The system of claim 13, wherein the second volume of ink is based on lateral ink bleed of print paper.

35. The system of claim 13, wherein the second volume of ink is determined based on printer driver for the printer.

36. The system of claim 13, wherein the second volume of ink is determined based on at least one dimension of the original colored image object.

37. The system of claim 13, wherein the second volume of ink is determined based on whether the original colored image object has a property indicating it is printed as foreground, such that the second volume of ink for printing the original colored image object as foreground is different than the second volume of ink for printing the original colored object image printed as background.

38. The system of claim 13, wherein the second volume of ink for printing the original colored image object as foreground is different than the volume of ink for printing the original colored object image printed as background.

39. The system of claim 13, wherein the color printer is further configured to print the modified colored image object.

40. The system of claim 13, wherein the second volume of ink is determined based on whether the original colored image object has a property indicating it is printed as background, such that the second volume of ink for printing the original colored image object as background is different than the second volume of ink for printing the original colored object image printed as foreground.

* * * * *